US008566922B2

(12) United States Patent
Hargis

(10) Patent No.: US 8,566,922 B2
(45) Date of Patent: Oct. 22, 2013

(54) SYSTEM FOR ISOLATING A SECURED DATA COMMUNICATION NETWORK

(76) Inventor: Barry W. Hargis, Florence, AL (US)

( * ) Notice: Subject to any disclaimer, the term of this patent is extended or adjusted under 35 U.S.C. 154(b) by 201 days.

(21) Appl. No.: 13/115,362

(22) Filed: May 25, 2011

(65) Prior Publication Data

US 2012/0304279 A1    Nov. 29, 2012

(51) Int. Cl.
*G06F 15/16* (2006.01)
(52) U.S. Cl.
USPC ........ 726/14; 726/12; 726/7; 726/1; 370/392; 370/338; 713/176; 713/178; 713/300
(58) Field of Classification Search
USPC ................. 726/14, 3; 370/230; 713/168–170; 709/228
See application file for complete search history.

(56) References Cited

U.S. PATENT DOCUMENTS

| | | | | |
|---|---|---|---|---|
| 6,119,228 A * | 9/2000 | Angelo et al. | ................. | 713/180 |
| 6,317,831 B1 * | 11/2001 | King | ............................. | 713/171 |
| 6,345,307 B1 | 2/2002 | Booth | | |
| 6,430,690 B1 * | 8/2002 | Vanstone et al. | ............... | 713/182 |
| 7,260,833 B1 * | 8/2007 | Schaeffer | ........................... | 726/3 |
| 8,046,821 B2 * | 10/2011 | Nguyen | ............................ | 726/2 |
| 8,068,415 B2 * | 11/2011 | Mraz | ............................. | 370/230 |
| 2004/0024882 A1 | 2/2004 | Austin et al. | | |
| 2004/0158635 A1 | 8/2004 | Walls-Manning et al. | | |
| 2005/0033990 A1 | 2/2005 | Harvey et al. | | |
| 2005/0165939 A1 | 7/2005 | Nikunen et al. | | |
| 2006/0072531 A1 * | 4/2006 | Ewing et al. | ................... | 370/338 |
| 2006/0080536 A1 * | 4/2006 | Teppler | ......................... | 713/176 |
| 2006/0271617 A1 | 11/2006 | Hughes, Jr. et al. | | |
| 2007/0203970 A1 | 8/2007 | Nguyen | | |
| 2008/0259929 A1 * | 10/2008 | Mraz | .......................... | 370/395.1 |
| 2008/0301799 A1 | 12/2008 | Arnold et al. | | |
| 2010/0013625 A1 * | 1/2010 | Kouzan et al. | ................ | 340/508 |
| 2010/0070638 A1 * | 3/2010 | Bhatt et al. | .................... | 709/229 |
| 2011/0153969 A1 * | 6/2011 | Petrick | ........................... | 711/163 |
| 2012/0291096 A1 * | 11/2012 | Boldyrev et al. | ................. | 726/3 |

FOREIGN PATENT DOCUMENTS

WO      WO 03/055146 A1     7/2003

OTHER PUBLICATIONS

R. Kisner, Safety and Nonsafety communications . . Power Plants, Aug. 2007, pp. 1-68.*

* cited by examiner

*Primary Examiner* — Nathan Flynn
*Assistant Examiner* — Viral Lakhia
(74) *Attorney, Agent, or Firm* — David E. Mixon; Bradley Arant Boult Cummings LLP

(57) ABSTRACT

A system for isolating a data communication network has been developed. The system includes an internal computer system with an internal computer that is in data communication with the internal computer system, and an external computer system with an external computer that is in data communication with the external computer system. The internal and external computers are connected with an ethernet adapter that only allows transmission of data from the internal computer system and prohibits the receipt of data by the internal computer system.

6 Claims, 4 Drawing Sheets

SYSTEM FOR ISOLATING A SECURED DATA COMMUNICATION NETWORK

FIELD OF THE INVENTION

The invention relates generally to data communications networks. More specifically, the invention relates to a system for isolating a secured data communication network.

BACKGROUND ART

Security of computer networks is a growing concern, especially for data communication networks for sensitive sites such as nuclear plants, utility distribution systems, etc. The reliability of these networks is critically important and prevention of unauthorized access is fundamental to maintaining the operation and security of such network. Consequently, a system for isolating a secured data communication network from unauthorized access is highly desired.

SUMMARY OF THE INVENTION

In some aspects, the invention relates to a system for isolating a data communication network, comprising: a secured internal computer system; an internal computer that is in data communication with the internal computer system; an unsecured external computer system; an external computer that is in data communication with the external computer system; an RJ45 ethernet jack that connects the internal computer with the external computer so that the internal computer system may transmit data to the external computer; and where the transmit pins on the RJ45 ethernet jack for the external computer are not connected to the internal computer to prevent transmission of data from the external computer to the internal computer.

In other aspects, the invention relates to a system for isolating a data communication network, comprising: an internal computer system; an internal computer that is in data communication with the internal computer system; an external computer system; an external computer that is in data communication with the external computer system; and an ethernet adapter that connects the internal computer with the external computer so that data communication is established between the internal computer system and the external system, where the ethernet adapter only allows transmission of data from the internal computer system and prohibits the receipt of data by the internal computer system.

In other aspects, the invention relates to a system for isolating a data communication network, comprising: an internal computer system; an external computer system; and means for allowing one way communication from the internal computer to the external computer system with an ethernet adapter.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

A system has been developed for isolating a secured data communication network. The system is placed between one computer system and another computer system to provide a true one-way communication interface. Data can flow in only one direction.

Figure 1:
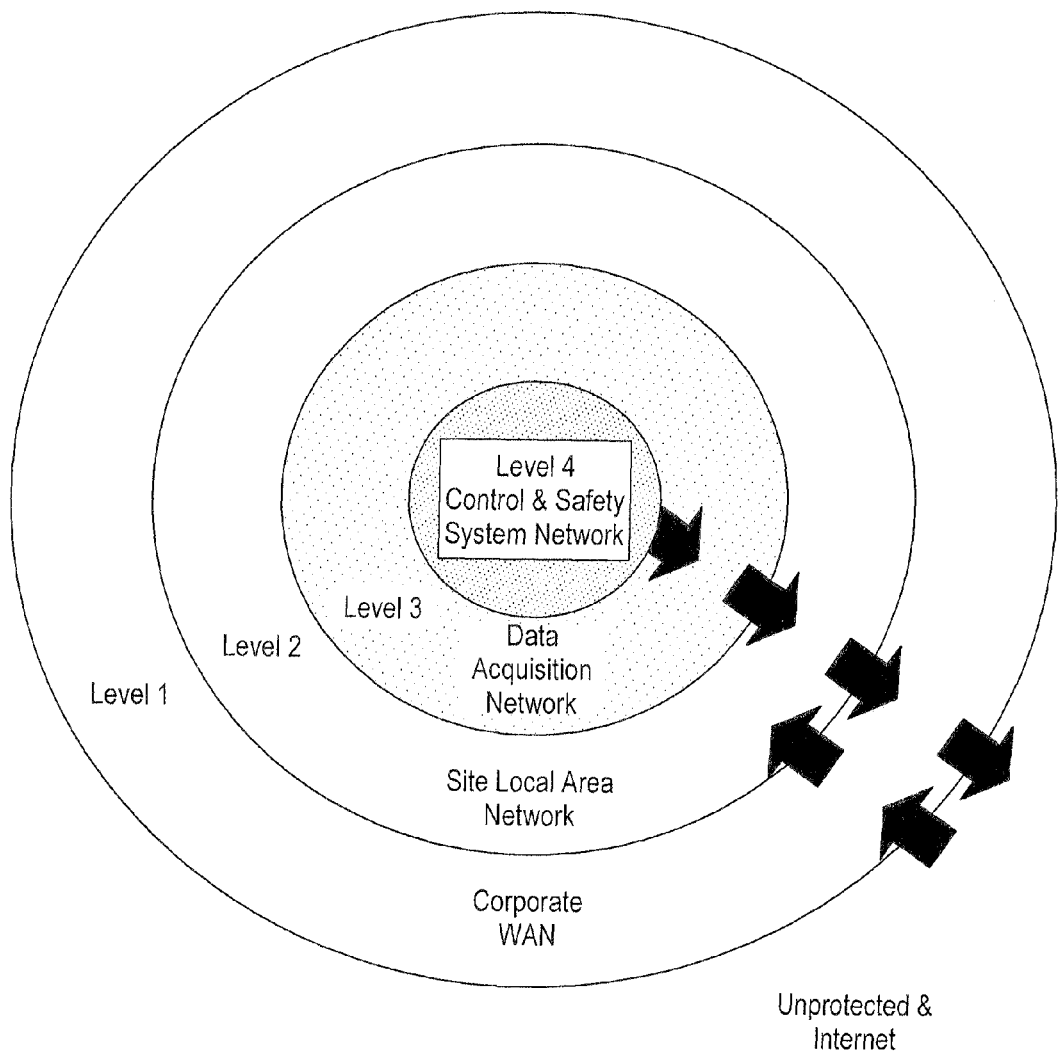
FIG. 1 shows a diagram of data network connectivity for a power plant in accordance with one embodiment of the present invention.

FIG. 1 shows one example of data network connectivity for a nuclear power plant in accordance with the present invention. The system includes 4 levels of increasing security. On the exterior, is the internet which exists with essentially no security protection. Level 1 is a corporate wide area network (WAN) which represents connectivity between corporate assets. The assets have multi-directional communications (represented by the arrows) with the external internet and other levels. This allows communication and sharing of data between corporate offices, remote offices, power plants, etc. Level 2 is a site local area network (LAN) which houses local business applications such as finance, workflow applications, local intranet, e-mail services, etc. This level also allows multi-directional communications with the external internet and other levels.

Level 3 represents the first level with restricted communications. Level 3 is a data acquisition network that is primarily a plant system network and associated components that collect plant data. Level 3 is separated and isolated from Level 2 in that data may only flow to and not be received from Level 2. Level 4 is the control and safety system network. It includes all plant control systems and it is separate and isolated from Level 3 with a one way communications path. The one way communications paths for Levels 3 and 4 are defensive in nature. The paths represent an interface boundary the allows one way data flow from Level 4 to Level 3 and from Level 3 to Level 2. However, data is not allowed to pass back thus isolating Level 4 and Level 3 for security purposes.

For the purpose of explanation, the present invention will be described using the example of a data network for a nuclear power plant consistent with FIG. 1. However, it should be clear that the present invention can be applied with the same effectiveness for secure networks with other uses. Thus, the invention should not be limited to use with a network for a nuclear power plant but instead by the language of the claims.

Figure 2A:
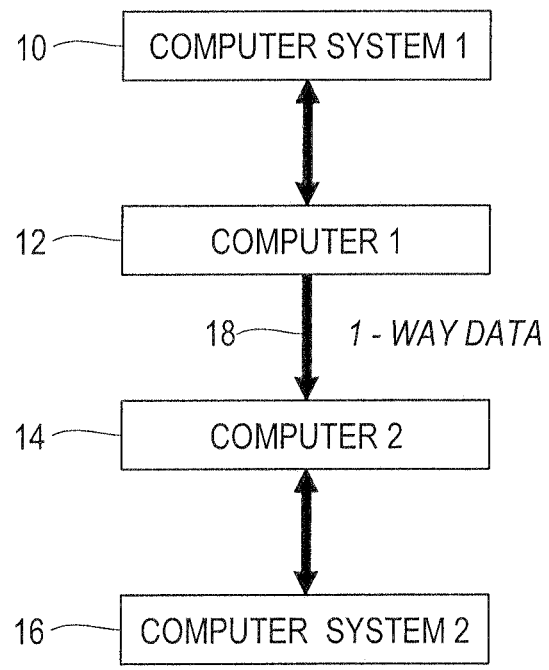
FIG. 2a shows a flow diagram for data connectivity and system security in accordance with one embodiment of the present invention.

FIG. 2a shows a flow diagram for data connectivity and system security in accordance with one embodiment of the present invention. The system includes a highly sensitive and secure Computer System 1 10 that is in data communication with Computer 1 12 (also listed as PC1). Computer 1 12 is communication with Computer 2 14 (also listed as PC2) through a one way data communication link 18. Finally, Computer 2 14 is data communication with an external Computer System 2 16. Both PC1 12 and PC2 14 run the Windows XP Operating System in one embodiment of the present invention.

In this embodiment, Computer System 1 10 is an internal computer or control system within a plant that provides data in a one-way fashion through the present invention. Computer System 2 16 is an external computer system within a plant that receives data in a one-way fashion from one way data communication link 18 that is located between two computer systems. The one way data communication link 18 is provided by using an "ethernet adapter". "Ethernet" is a family of frame-based computer networking technologies for local area networks (LAN). It defines a number of wiring and signaling standards for the physical layer of the standard networking model as well as a common addressing format and a variety of medium access control (MAC) procedures at the lower part of the data link layer (DLL). It is standardized as IEEE Standard 802.3. An "ethernet adapter" is the hardware required to attach to an Ethernet network. It typically resides on an expansion board, but is sometimes built into the motherboard of a computer.

During the operation of the system, PC1 12 performs poll-and-receive communications with Computer System 1 10. PC1 12 then sends this data via a one-way Ethernet interface 18 to PC2 14. The transmit wiring from PC2 14 to PC1 12 is not connected—this provides a physical isolation of PC2 14 to PC1 12. Computer System 2 then performs poll-and-receive communications with PC2 14.

Figure 2B:
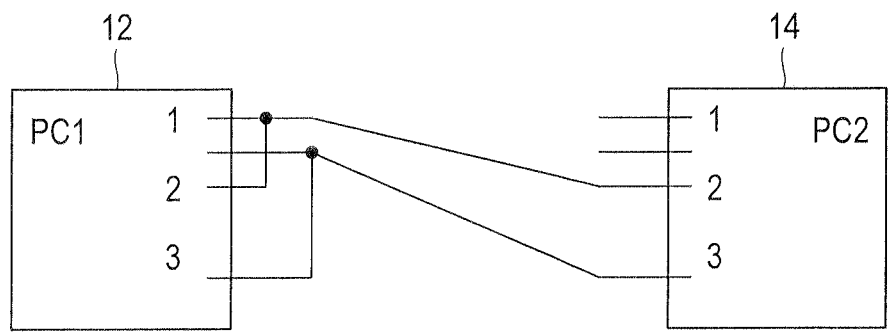
FIG. 2b shows a schematic diagram of pin connections between computers for data connectivity and system security in accordance with one embodiment of the present invention.

Protection of the PC1 12 side of the present invention is achieved by the connection interface between PC1 12 and PC2 14 shown in FIG. 2*b*. A standard RJ45 Ethernet jack is used. The standard pin-outs for this jack are: Pins 1 and 2—Transmit; and Pins 3 and 6—Receive. A special adapter is installed in the present invention to achieve this connection. By connecting the transmit pair of wires on PC1 12 to it's receive pair, the ethernet port hardware detects transmitted signals and thereby generates a link light. The same transmit pair of wires are connected to the receive pair on PC2 14. The transmit pair on PC2 14 is not connected. With this connection scheme, PC1 12 is capable of transmitting information to PC2 14 and PC2 14 cannot transmit information to PC1 12. Therefore, any computer system to which PC1 12 is connected cannot be communicated with using any computer system connected to PC2 14.

Figure 3:
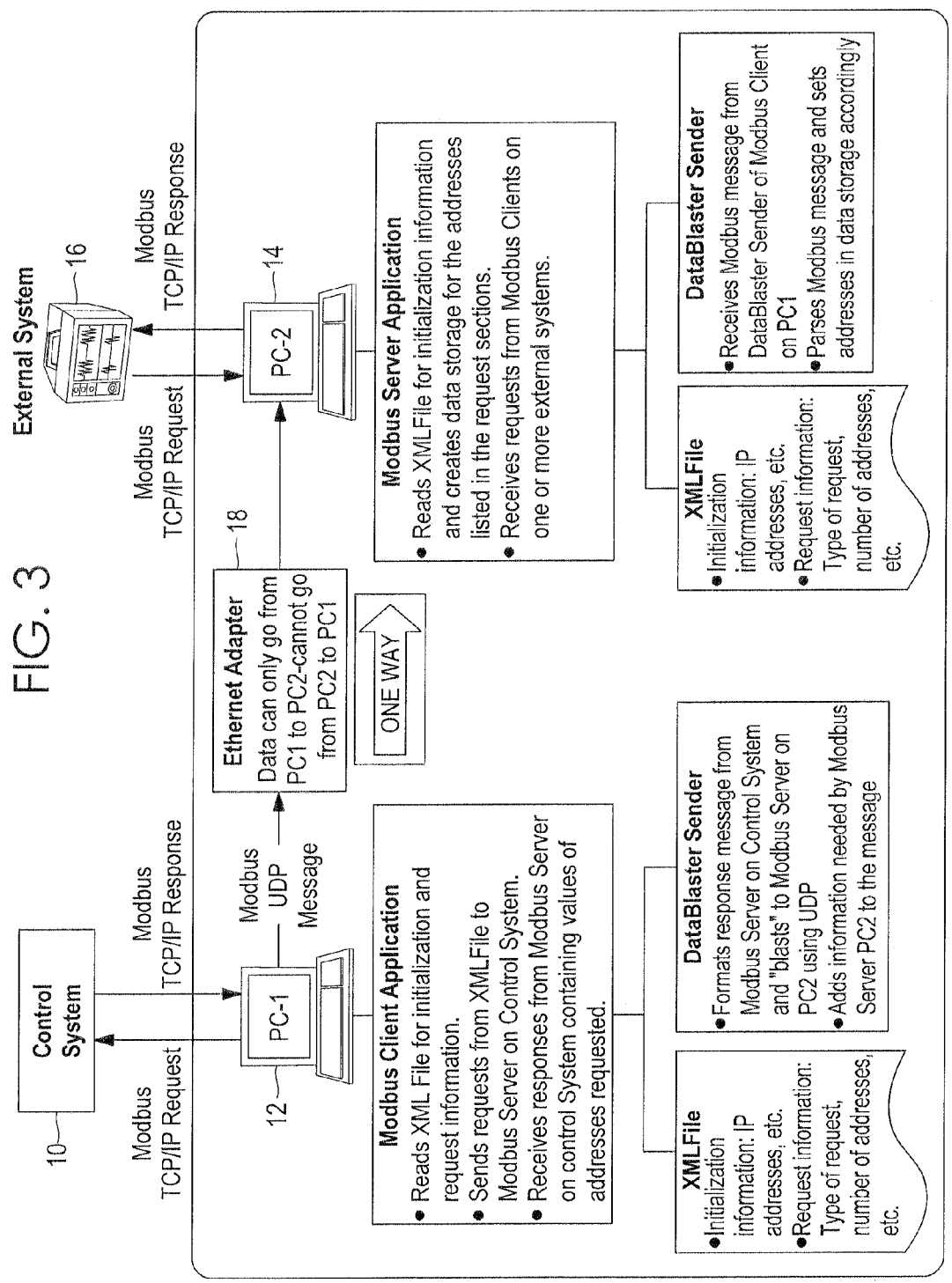
FIG. 3 shows overview diagram of a system for isolating a data communication network in accordance with one embodiment of the present invention.
Figure 4:
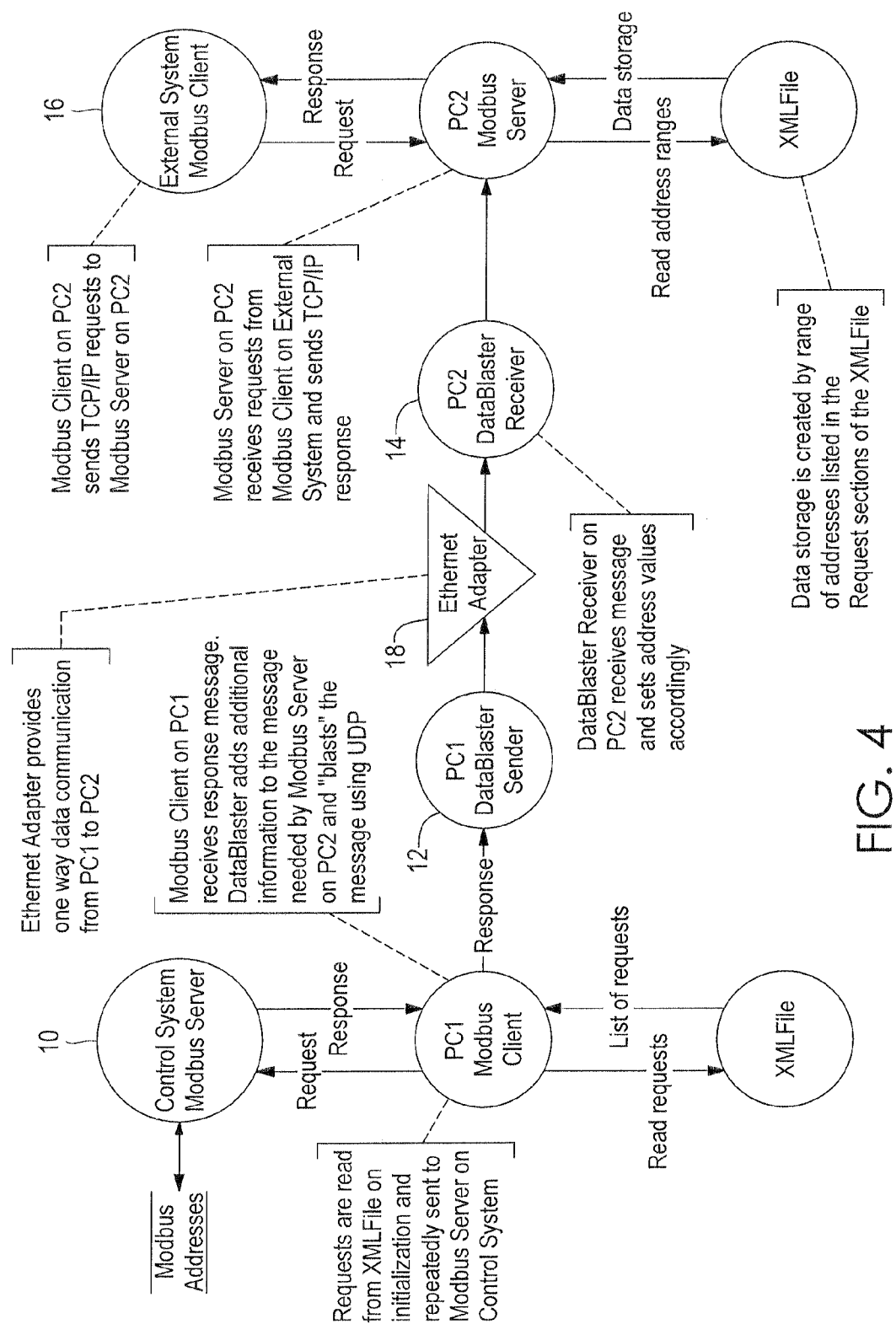
FIG. 4 shows a data flow diagram of a system for isolating a data communication network in accordance with one embodiment of the present invention.

As shown in FIGS. 3 and 4, information is transmitted from PC1 12 to PC2 14 using the UDP/IP communication standard. "UDP/IP" is a user datagram protocol/internet protocol which is a network transport that uses a simple transmission model. This standard does not employ handshaking to ensure data is properly transmitted from one point to another. To provide an assurance of data integrity, both PC1 12 and PC2 14 perform a CRC calculation on the data. A "CRC" is a cyclic redundancy check which is a software method that calculates a short, fixed-length binary sequence for each block of data and sends or stores them both together. When a block is received the device repeats the calculation. If the new CRC does not match the one sent, then the block is considered to contain a data error; otherwise the data is assumed to be error free.

PC1 12 functions may include: performing poll-and-receive communications with an internal computer system via an ethernet port; retrieving packages of data retrieved the internal computer system; setting flags if communications with the internal computer system fails or if the system reports bad data is being sent; running intrusion detection to track Windows events and setting a flag if an event is detected; performing a CRC on obtained data; and transmitting data, CRC, and flags via a different ethernet network port. PC2 14 functions may include: receiving and unpacking data, CRC, and messages from PC1 12; performing a CRC calculation on the received data; setting a flag if no information is received from PC1 12; setting a flag if a different CRC from PC1 12 is calculated; setting a flag if communications with the internal computer system fails; running intrusion detection to track Windows events and setting a flag if an event is detected; and becoming a Modbus server to allow an external computer system to perform poll-and-receive communications to obtain data from the protected computer system. The "Modbus" protocol is presently employed on both PC1 12 and PC2 14. "Modbus" is a high-level communication protocol for industrial networks that is widely used with TCP/IP over ethernet networks. PC1 12 performs Modbus client functions to receive information from an internal computer (e.g. control) system. Another interface could be written to bring in data to PC1 12 in other formats.

The software modules for operating the system may be written in Microsoft C++ and compiled using version 8. The following examples are of modules that may be compiled into an executable file running on PC1.

PC1 XMLFile—This module reads an XML file that describes numerous attributes that are used by PC1 to perform its functions. The user can edit the XML file to change data that is obtained and transmitted, along with adjusting various limits. When the defined limits are exceeded, flags are generated. The module opens the file and determines the following: IP address of internal computer system with which it communicates; Modbus address ranges of points to be read from internal system; communications timeout limit (how long to wait on the internal communications system before declaring the connection lost); and quality limit (how many repetitive "bad" quality readings from the internal system are acceptable before PC1 sets the flag for bad quality of data).

PC1 MBClient—This module opens a communication link with the internal computer system. Modbus addresses defined in the XML file are requested from the internal computer system. The module then receives the data from the internal computer system, including any error messages. The data and error messages are placed into memory.

PC1 DBMessage—This module receives the information from MBClient and IntrusionDetection modules for delivery through DBSender to PC2. The message contains: data from internal computer system; quality code for no communications with the internal computer system; "bad" quality code from the internal computer system; Modbus error messages; and intrusion detection flag.

PC1 IntrusionDetection—This module receives an input from "Eventrecorder" software that may be installed on PC1. If any monitored Windows event is detected, the input will be received by this module, and this module sets a flag. The user is to determine the Windows events to be monitored.

PC1 DBSender—This module takes the DBMessage, adds necessary information such as the starting address, and builds Modbus packets to transmit to PC2. Before transmitting a packet to PC2, this module performs a CRC on the data.

The following modules may be compiled into executable file running on PC2:

PC2 XMLFile—This module reads the XML file that describes numerous attributes that are used by PC2 to perform its functions. (It should be noted that this is the same file that is on PC1.) The user can edit the XML file to change data that is obtained and transmitted, along with adjusting various limits. When the defined limits are exceeded, flags are generated. The module opens the file and determines the following: Modbus address ranges of points to be read from internal system; communications timeout limit (how long to wait on the PC1 communications before declaring the connection lost); and quality limit (how many repetitive "bad" CRC checks on data from PC1 are acceptable before PC2 sets the flag for bad quality of data).

PC2 DBReceiver—This module receives the data transmitted from PC1. It unpacks the data and prepares it for use on PC2's Modbus server. This module performs a CRC on the received data and compares it to the CRC calculated by PC1 for accuracy.

PC2 QualityCode—This module develops the quality code Modbus status register, which is user-defined in the XML file. Quality codes are single bits that indicate the following attributes (by bit in the status register; a logic "1" indicates the specified message is TRUE):

0x00=Good
0x01=No data received on PC1 from control system
0x02=Intrusion detected on PC1
0x04=Modbus Exception occurred from control system to PC1
0x08=No data received on PC2 from PC1
0x10=Bad CRC on message (from PC1 to PC2)
0x20=Intrusion detected on PC2
0x40=Heartbeat (toggles between 0 and 1 at user-defined interval).

PC2 IntrusionDetection—This module receives an input from "Eventrecorder" software that is installed on PC2. If any monitored Windows event is detected, the input will be received by this module, and this module sets a flag. The user is to determine the Windows events to be monitored.

Finally, the present invention tests to ensure the following are acceptable: applications automatically start on both PC1 and PC2 to transmit data from an "internal" computer to an "external" computer; data is appropriately transmitted from an "internal" computer to an "external" computer (a data transmission availability envelope is established from this testing where it is desirable for the data to contain 100 analog points and 1000 digital points transmitted at least 10 times per second); PC2 cannot transmit information to PC1; data transmission automatically recovers whenever events occur that interrupt service (i.e. network cable is disconnected/reconnected, PC1 is powered off/on, etc.); and appropriate quality codes are generated when:

a. PC1 does not communicate with the "internal" computer
b. PC1 receives bad data from the "internal" computer
c. PC1 does not communicate with PC2
d. PC2 receives bad data from PC1
e. Intrusions are detected on either PC1 or PC2.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A system for isolating a data communication network, comprising:
    a secured internal computer system;
    an internal computer that is in data communication with the internal computer system;
    an unsecured external computer system;
    an external computer that is in data communication with the external computer system;
    an RJ45 ethernet jack that connects the internal computer with the external computer so that the internal computer system may transmit data to the external computer using a UDP/IP communication standard where the communication data integrity from the internal computer to the external computer is check with a cyclic redundancy check (CRC) calculation;
    and where the transmit pins on the RJ45 ethernet jack for the external computer are not connected to the internal computer to prevent transmission of data from the external computer to the internal computer.

2. A system for isolating a data communication network, comprising:
    an internal computer system;
    an internal computer that is in data communication with the internal computer system;
    an external computer system;
    an external computer that is in data communication with the external computer system;
    and an ethernet adapter that connects the internal computer with the external computer so that data communication is established between the internal computer system and the external system using a UDP/IP communication standard, where the ethernet adapter only allows transmission of data from the internal computer system and prohibits the receipt of data by the internal computer system and where the communication data integrity from the internal computer to the external computer is check with a cyclic redundancy check (CRC) calculation.

3. The system of claim 2, where the ethernet adapter comprises an RJ45 ethernet jack that connects the internal computer and the external computer.

4. The system of claim 2, where the transmit pins of the ethernet adapter for the external computer are not connected.

5. The system of claim 2, where the internal computer communicates to the external computer using a Modbus communication protocol.

6. A system for isolating a data communication network, comprising:
    an internal computer that is in data communication with an internal computer system;
    an external computer that is in data communication with an external computer system;
    and means for allowing one way communication from the internal computer to the external computer system using a UDP/IP communication standard with an ethernet adapter that connects the internal computer with the external computer so that data communication is established between the internal computer system and the external system and where the ethernet adapter only allows transmission of data from the internal computer system and prohibits the receipt of data by the internal computer system and where the communication data integrity from the internal computer to the external computer is check with a cyclic redundancy check (CRC) calculation.

* * * * *